United States Patent [19]

Subramanian

[11] 4,410,482

[45] Oct. 18, 1983

[54] PROCESS FOR MAKING LAMINAR ARTICLES OF POLYOLEFIN AND A CONDENSATION POLYMER

[75] Inventor: Pallatheri M. Subramanian, Wilmington, Del.

[73] Assignee: E. I. Du Pont de Nemours & Co., Wilmington, Del.

[21] Appl. No.: 241,051

[22] Filed: Mar. 4, 1981

Related U.S. Application Data

[60] Continuation-in-part of Ser. No. 161,451, Jun. 20, 1980, abandoned, which is a division of Ser. No. 18,057, Mar. 6, 1979, abandoned.

[51] Int. Cl.$^3$ .......................... B29D 7/24; B29C 17/07
[52] U.S. Cl. .................................... 264/515; 264/171; 264/173; 264/210.6; 264/290.2; 264/349; 428/35; 428/516; 428/522; 428/910
[58] Field of Search ............ 264/171, 173, 514, 290.2, 264/515, 210.6, 349; 428/516, 522, 35, 36, 910

[56] References Cited

U.S. PATENT DOCUMENTS

| | | | |
|---|---|---|---|
| 2,465,319 | 3/1949 | Whinfield et al. | 260/75 |
| 3,093,255 | 6/1963 | Mesrobian et al. | 215/1 |
| 3,264,272 | 8/1966 | Rees | 260/78.5 |
| 3,373,222 | 3/1968 | Armstrong | 260/857 |
| 3,373,223 | 3/1968 | Armstrong | 260/857 |
| 3,373,224 | 3/1968 | Mesrobian et al. | 260/857 |
| 3,382,305 | 5/1968 | Breen | 264/171 |
| 3,435,093 | 3/1969 | Cope | 260/857 |
| 3,487,059 | 12/1969 | Tyran | 260/85.7 |
| 3,519,701 | 7/1970 | Pilato | 260/874 |
| 3,541,069 | 11/1970 | Bristol et al. | 260/91.3 |
| 3,547,761 | 12/1970 | Rasmussen | 264/171 |
| 3,548,048 | 12/1970 | Hughes et al. | 264/171 |
| 3,579,609 | 5/1971 | Sevenich | 264/290.2 |
| 3,637,906 | 1/1972 | Parathoen | 264/290.2 |
| 3,639,527 | 2/1972 | Brinkmann et al. | 260/873 |
| 3,775,521 | 11/1973 | Yamamoto et al. | 264/171 |
| 3,819,792 | 6/1974 | Ono et al. | 264/515 |
| 3,857,754 | 12/1974 | Hirata et al. | 161/227 |
| 3,873,667 | 3/1975 | Preto et al. | 264/234 |
| 3,953,655 | 4/1976 | Steinkamp et al. | 428/474 |
| 3,975,463 | 8/1976 | Hirata et al. | 260/897 |
| 4,026,967 | 5/1977 | Flexman, Jr. et al. | 260/878 R |
| 4,182,457 | 1/1980 | Yamada et al. | 428/35 |
| 4,243,627 | 1/1981 | Kornbaum | 264/171 |

FOREIGN PATENT DOCUMENTS 2746181 5/1978 Fed. Rep. of Germany .

OTHER PUBLICATIONS

Journal of Applied Polymer Science vol. 22, pp. 2081–2084 (1978).

*Primary Examiner*—Jeffery R. Thurlow

[57] ABSTRACT

A process for manufacturing laminar articles by forming heterogeneous melts of a combination of a polyolefin and a condensation polymer incompatible with the polyolefin along with an alkylcarboxyl-substituted polyolefin as a compatibilizing material.

13 Claims, No Drawings

PROCESS FOR MAKING LAMINAR ARTICLES OF POLYOLEFIN AND A CONDENSATION POLYMER

RELATED APPLICATIONS

This application is a continuation-in-part of U.S. Ser. No. 161,451, filed June 20, 1980, now abandoned, which was a division of U.S. Ser. No. 018,057, filed Mar. 6, 1979, now abandoned.

DESCRIPTION

1. Technical Field

This invention relates to manufacture of laminar, shaped, articles of a heterogeneous blend of a polyolefin and a condensation polymer, incompatible with the polyolefin, and to such articles especially in the form of barriers to permeation of fluid, liquid and gaseous, materials.

2. Background Art

U.S. Pat. No. 3,873,667 discloses a heat treatment process for decreasing the permeability of gases through a homogeneous composition of polyolefin and polyamide. That composition is disclosed to include an ionic hydrocarbon copolymer of ethylene and either acrylic or methacrylic acid. There is no suggestion that heterogeneous blends would exhibit improvement over homogeneous blends.

U.S. Pat. No. 3,093,255 discloses compositions of polyolefin combined with polyamide. The patent clearly discloses that the polyolefin and the polyamide must be subjected to intensive mixing under high pressures and that homogeneity is desired over heterogeneity.

U.S. Pat. Nos. 3,373,222; 3,373,223; and 3,373,224 all disclose homogeneous polymeric blends of polyolefin, polyamide and some dispersant material to obtain homogeneous blends exhibiting decreased permeability and improved mechanical properties as compared with blends having no dispersant. U.S. Pat. No. 3,373,222 discloses carboxylated polyethylene; U.S. Pat. No. 3,373,223 discloses a copolymer of ethylene with acrylic acid or methacrylic acid; and U.S. Pat. No. 3,373,224 discloses a metal ion containing copolymer of ethylene and an $\alpha,\beta$-ethylenically unsaturated monocarboxylic acid. All of those patents disclose the benefit of utilizing the dispersant to obtain a homogeneous blend and none suggests that heterogeneous blends would be useful.

German published Application No. 2,746,181 discloses that a dispersion of polyvinylchloride partially dissolved in polyvinyl alcohol can be gelled and then subjected to laminar flow by rolling, molding or extruding the gel to yield a multilayer structure of low permeability to gases. The German Application discloses initial use of a homogeneous blend of the polymers and does not disclose use of either, a polyolefin as one polymer component, or a dispersant such as was required in the other, previously-considered, patents.

U.S. Pat. Nos. 3,857,754 and 3,975,463 disclose blended compositions of polyolefin, saponified ethylene-vinyl acetate copolymer, and a carbonyl-containing thermoplastic polymer. Those patents disclose that a structure of three layers can be formed from a homogeneous molten blend of the components so long as a difference in melt flow rate of at least 1 cm/sec is maintained between the polyolefin and the saponified ethylene-vinyl acetate copolymer. Those patents disclose that the mixing prior to extrusion utilizes high shear equipment and there is no suggestion that low shear mixing and heterogeneous blends would provide any benefits.

SUMMARY OF THE INVENTION

According to this invention there is provided a process for manufacturing a laminar, shaped, article of polymeric material comprising the steps of establishing a melted, heterogeneous, blend of a polyolefin, a condensation polymer, incompatible with the polyolefin, and an alkylcarboxyl-substituted polyolefin; and forming the melted blend by stretching a body of the melt and cooling the stretched body to below the melting point of the lowest melting polymer component.

There is also provided a laminar, shaped, article comprising a combination of the polyolefin, the condensation polymer, and the alkylcarboxyl-substituted polyolefin wherein the polyolefin and the condensation polymer are present, in the article, as a multitude of thin, substantially two-dimensional, parallel and overlapping layers of material and the alkylcarboxyl-substituted polyolefin is believed to be present between the layers and adheres the layers together.

DESCRIPTION OF THE INVENTION

Films, filaments, sheets, containers, tubing, and other shaped articles have long been made from polymeric compositions. Special qualities desired for shaped articles have required special polymers or specially formulated polymeric compositions. This invention utilizes a special process and a special formulation of polymers to yield a composition which exhibits improved barrier to fluid permeation and improved mechanical properties.

The general product of this invention is a laminar shaped article made from a mixture of two incompatible polymers and one polymer which serves to adhere together laminar domains of the incompatible polymers. The product is made by mixing together particles of the polymers, heating the mixture to yield a heterogeneous melt of material, and forming the melt in a way which results in stretching the melt to yield an elongated discontinuous polymer phase.

In one embodiment, the polymer particles, in unmelted form, are mixed thoroughly so as to provide a statistically homogeneous distribution and care must be exercised to avoid substantial additional mixing after the polymers have been heated to a melt. In another embodiment, the polymer particles can be combined in softened or molten form so long as the combination of polymers maintains a heterogeneous character. The blend can, also, be established by combining the polymers or the condensation polymer is not softened or molten and then heating the combination. The success of the invention depends on establishing a melted heterogeneous blend of incompatible polymers so that, when the melt is stretched, such as by extrusion forces, one polymer is in the form of a continuous matrix phase and another polymer is in the form of a discontinuous distributed phase. The polymer comprising the discontinuous phase is present as a multitude of thin, substantially two dimensional, parallel and overlapping layers embedded in the continuous phase.

Also necessary for the success of this invention, is the polymer which adheres together adjacent layers or domains of the incompatible polymers. In view of its believed purpose, that polymer can be termed a compatibilizer; but the actual mechanism of its operation is not completely understood. It is believed that at least some of the compatibilizer is concentrated, in the laminar shaped article of this invention, between the adjacent layers of incompatible polymer joined partially with one layer and partially with an adjacent layer, thus adhering the layers together. Without the compatibilizer, shaped articles formed from heterogeneous melts of incompatible polymer have poor mechanical properties and, generally, cannot even be extruded or molded to yield unitary articles. For the purposes of this invention, "incompatible polymers" mean polymeric materials which have substantially no mutual miscibility in the melt form.

Although it is not required, it is preferred that the condensation polymer used in practice of this invention is, as stated, in particulate form; and it is desired that both, the polyolefin and the condensation polymer should be mixed as particles. The particles should, as a general rule, be of a size, such that, the molten blend of incompatible polymers, when introduced to some melt stretching means, such as extrusion die lips, exhibits the heterogeneity necessary for practice of the invention. When the particles, especially particles of the condensation polymer, are of too small a size, the melted blend, even though not excessively mixed, tends to function as a homogeneous composition because the domains of material making up the discontinuous polymer phase are so small. When the particles, especially particles of the condensation polymer, are of too large a size, the melted blend tends to form into shaped articles having a marbleized structure rather than a laminar structure;—the large domains of the materials which would make up the discontinuous phase extending to opposite boundaries of the shaped articles and causing disruption of the material which would make up the continuous phase. The particles are preferably generally regular in shape, such as cubical or spherical or the like. The particles may, however, be irregular; and they may have one dimension substantially greater than another dimension such as would be the case, for example, when flakes of material are used.

When each of the incompatible polymers is present as individual particles, the particles are generally of approximately the same size although such is not required. The compatibilizer can be provided by itself as individual particles or it can be mixed into, coated onto, or otherwise combined with one or both of the incompatible polymers.

The thickness of the layers of material in the discontinuous phase is a function of the particle size combined with the degree of stretching in the forming step. The particle size of the polymer which will be the discontinuous phase is generally selected with a view toward resulting, after stretching, in overlapping layers which can be from about 0.5 to 50 micrometers thick and perhaps, sometimes slightly thicker.

Mixing particles of polymers can be accomplished by any well-known means such as by means of a vee-blender or a tumble mixer or, on a larger scale, by means of a double-cone blender. Continuous mixing of the particles can be accomplished by any of several well-known methods. Of course, the particles can also be mixed by hand;—the only requirement of the mixing being that any two statistical samplings of the mixture in a given mass of material should yield substantially the same composition. The mixing of the incompatible polymers can be accomplished by adding particles of the higher melting polymer to a melt of the lower melting polymer maintained at a temperature below the higher melting point. In that case, the melt is agitated to obtain an adequate mixture; and the mixture is, thus, ready for the heating step.

Once mixed, the incompatible polymers are heated to a temperature greater than the melting point of the highest melting polymer component. It is noted that the heating is conducted for the purpose of stretching the softened or melted blend. In the case of an incompatible polymer which exhibits no well-defined melting temperature, "melting temperature", as used here, refers to a temperature at least high enough that the polymers have been softened to the degree required to stretch each of the polymers in the blend. That heating results in a softened or melted, heterogeneous blend of materials and the heating must be conducted in a manner which avoids substantial additional mixing of the incompatible polymers because such mixing could cause a homogenization and combination of the melted particles and could result in a melt and a shaped article of homogeneous, unlayered, composition. The heating can be conducted by any of several well-known means and is usually conducted in an extruder. It has been learned that a single-screw extruder of the type which is designed for material transport and not material mixing can be used between the heating and forming steps of this invention without causing homogenization of the two phase incompatible polymer composition. Low shear and low mixing extruders of the kind normally used for polyvinyl chloride, acrylonitrile, or polyvinylidene chloride can be used to practice this invention if they are used in a way to melt and transport the materials and minimize mixing of the components. High shear and high mixing extruders of the kind normally used for nylon and polyethylene cannot, generally, be used to practice this invention. To the extent that the composition retains an aspect of heterogeneity, to that extent the process and the product of this invention can be realized.

The forming step requires stretching of the melted blend followed by cooling. Stretching is an elongation of the two phase melt to cause a substantial change in the dimensions of the particles in the discontinuous phase. Stretching can be accomplished by any of several means. For example, the melt can be stretched by being squeezed between rollers or pressed between platens or extruded between die lips. Molding processes such as blow molding also cause stretching in accordance with this process. In the manufacture of containers as shaped articles, the stretching can be accomplished by a combination of extruding a blend of the heterogeneous melt to yield a container preform or parison followed by blow molding the parison into a finished container.

The stretching can be in one direction or in perpendicular directions. Whether the stretching is conducted in one direction or two, there should be an elongation of from 100 to 500 percent in at least one direction; and an elongation of from 100 to 300 percent is preferred. While the upper limit set out herein is not critical, the lower limit is critical insofar as inadequate stretching does not yield the improved barriers to fluid permeation which characterize this invention. Avoidance of excessive stretching is important only insofar as excessive elongation of the melt may lead to weakening or rupture of the article.

Stretching is followed by cooling to below the temperature of the melting point of the lowest melting component to solidify the shaped article. The cooling can be conducted by any desired means and at any convenient rate. In the case of stretching by blow molding, the mold is often chilled to cool the article; and, in the case of extruding a film, cooling can be accomplished by exposure to cool air or by contact with a quenching roll.

As to the proportions of the components for practicing the invention, the incompatible, condensation, polymer which is to be a discontinuous phase in the shaped articles should be present in generally less than about 40 weight percent of the mixture. It has been found that the incompatible, condensation, polymer should be present in more than about 5 weight percent and less than about 40 weight percent of the mixture and about 10 to 30 weight percent is preferred. The polyolefin should be present in more than about 60 weight percent and less than about 95 percent of the mixture and 70 to 90 weight percent is preferred. The compatibilizer should be present in about 5 to 30 weight percent of the discontinuous phase and about 10 to 20 weight percent is preferred. Any of the components can be used to introduce inert fillers into the composition provided only that the fillers are not of a kind or in an amount which would interfere with formation of the layered construction or with the desired or required properties of the composition. Amounts of opacifiers, colorants, lubricants, stabilizers and the like which are ordinarily used in structural polymeric materials can be used herein. The amount of such filler is not included in the calculation of amounts of incompatible polymers and compatibilizers.

The polyolefins used in the composition of the invention include polyethylene, polypropylence, polybutylene, copolymers of those materials, and the like. Polyethylene is preferred and may be high, medium, or low density.

The condensation polymer, incompatible with the polyolefin, includes polyamides, polyesters such as polyethylene terephthalate and polybutylene terephthalate and polycarbonates.

Polyamides and copolyamides are well known and are made by reacting carboxylic acids with primary amines under well-known conditions. Examples of carboxylic acids used in polyamide preparation are adipic acid, suberic acid, sebacic acid, azelaic acid, malonic acid, glutaric acid, pimelic acid, and the like. Examples of primary amines are tetramethylene diamine, pentamethylene diamine, hexamethylene diamine, octamethylene diamine, and the like. Exemplary polyamides include polypentamethylene adipamide, polyhexamethylene adipamide, polyhexamethylene sebacamide, polyamides obtained from lactams such as caprolactams and from amino acids such as 11-aminoundecanoic acid, and the like. Polyhexamethylene adipamide and polycaproamide are preferred.

Polyesters are well known and are made by reacting dibasic carboxylic acids with glycols under well-known conditions. Examples of carboxylic acids used in preparation of polyesters are terephthalic acid, isophthalic acid, and the like. Examples of glycols, ethylene glycol, butylene glycol, and other so-called polymethylene glycols having 2 to 10 methylene groups. Exemplary polyesters are polyethylene terephthalate, polybutylene terephthalate, and the like. Polyethylene terephthalate is preferred.

Polycarbonates are disclosed in the *Handbook of Common Polymers,* compiled by W. J. Roff and J. R. Scott, CRC Press, Cleveland, Ohio, U.S.A. (1971).

The alkylcarboxyl-substituted polyolefin compatibilizer is a polyolefin which has carboxylic moieties attached thereto, either on the polyolefin backbone itself or on side chains. By "carboxylic moiety" is meant carboxylic groups from the group consisting of acids, esters, anhydrides, and salts. Carboxylic salts are neutralized carboxylic acids and a compatibilizer which includes carboxylic salts as a carboxylic moiety also includes the carboxylic acid of that salt. Such compatibilizers are termed ionomeric polymers.

Compatibilizers can be prepared by direct synthesis or by grafting. An example of direct synthesis is the polymerization of an $\alpha$-olefin with an olefinic monomer having a carboxylic moiety; and an example of grafting is the addition of a monomer having a carboxylic moiety to a polyolefin backbone. In the compatibilizer made by grafting, the polyolefin is polyethylene or a copolymer of ethylene and at least one $\alpha$-olefin of 3–8 carbon atoms such as propylene, and the like, or a copolymer including at least one $\alpha$-olefin of 3–8 carbon atoms and a diolefin, such as 1,4-hexadiene, and the like. The polyolefin is reacted with an unsaturated carboxylic acid, anhydride, or ester monomer to obtain the grafter polymer. Representative eligible acids, anhydrides, and esters include: methacrylic acid; acrylic acid; ethacrylic acid; glycidyl methacrylate; 2-hydroxy ethylacrylate; 2-hydroxy ethyl methacrylate; diethyl maleate; monoethyl maleate; di-n-butyl maleate; maleic anhydride; maleic acid; fumaric acid; itaconic acid; monoesters of such dicarboxylic acids; dodecenyl succinic anhydride; 5-norbornene-2,3-anhydride; nadic anhydride (3,6-endomethylene-1,2,3,6-tetrahydrophthalic anhydride); and the like. Generally, the graft polymer will have from about 0.01 to about 20, preferably about 0.1 to about 10, and most preferably about 0.2 to about 5, weight percent graft monomer. Grafted polymers are described in greater detail in U.S. Pat. Nos. 4,026,967 and 3,953,655.

In the compatibilizer made by direct synthesis, the polymeric material is a copolymer of an $\alpha$-olefin of 2–10 carbon atoms and an $\alpha,\beta$-ethylenically unsaturated carboxylic acid, ester, anhydride, or salt having 1 or 2 carboxylic moieties. The directly synthesized compatibilizer is made up of at least 75 mole percent of the olefin component and from about 0.2 to 25 mole percent of the carboxylic component.

Ionomeric compatibilizer is preferably made from directly synthesized compatibilizer and is preferably made up of about 90 to 99 mol percent olefin and about 1 to 10 mol percent $\alpha,\beta$-ethylenically unsaturated monomer having carboxylic moieties wherein the moieties are considered as acid equivalents and are neutralized with metal ions having valences of 1 to 3, inclusive, where the carboxylic acid equivalent is monocarboxylic and are neutralized with metal ions having a valence of 1 where the carboxylic acid equivalent is dicarboxylic. To control the degree of neutralization, metal ions are present in an amount sufficient to neutralize at least 10 percent of the carboxyl moieties. Representative eligible $\alpha$-olefins and unsaturated carboxylic acid, anhydride, and ester monomers are those previously herein described. Ionomeric polymers are described in greater detail in U.S. Pat. No. 3,264,272.

The compatibilizer is generally about 0.5 to 3.0 weight percent carboxylic component.

In making shaped articles of this invention, the polyolefin is generally taken to provide the continuous phase and is used in an amount of about 60 to 95 weight percent of the total composition while the incompatible condensation polymer is taken to provide the discontinuous phase and is used in an amount of about 5 to about 40 weight percent of the total composition. The alkylcarboxyl-substituted polyolefin is used in an amount of about 0.5 to 5 weight percent of the total composition and more can be used, if desired.

DESCRIPTION OF THE PREFERRED EMBODIMENTS

EXAMPLE 1

In this example, polyolefin, polyamide, and compatibilizer were mixed: (a) to make a heterogeneous blend in accordance with the present invention; and (b) to make a homogeneous blend.

The polyamide was prepared by condensing hexamethylene diamine, adipic acid, and caprolactam to obtain a composition of 77.5 weight parts of polyhexamethylene adipamide and 22.5 weight parts of polycaproamide. That polyamide exhibited a melting point of about 215° C.

The polyolefin was a linear polyethylene having a density of 0.944 gram per cubic centimeter, a melt index of 0.24 as determined according to ASTM D-1238, and is commercially available from E. I. du Pont de Nemours and Company under the trademark designation "Alathon" PE 5593. Particles of the polyamide and the polyethylene were generally cubical and were about 3–4 millimeters on each side.

The alkylcarboxyl-substituted polyolefin compatibilizer was obtained by melt grafting fumaric acid onto polyethylene having a density of 0.958 gram per cubic centimeter and a melt index of about 10, as determined according to ASTM D-1238. The fumaric acid was grafted onto the polyethylene in an amount of about 0.9 weight percent based on the total weight of the polymer in accordance with the teaching of U.S. Pat. No. 4,026,967. Particles of the compatibilizer were generally cubical and were about 2–3 millimeters on a side. The material exhibited a melting point of about 135° C.

The mixture included 77 weight percent polyolefin, 20 weight percent polyamide, and 3 weight percent compatibilizer and was tumbled in a drum to achieve complete, even, particle distribution.
Example 1.

A portion of the mixture was fed directly into an extrusion blow molding machine such as that sold by Voith-Fischer Plastic Machines, Inc. of Paramus, N.J., U.S.A., identified as model FBZ 1000 and equipped with a low mixing screw and tooling. Bottles with a capacity of about 450 milliliters (16 ounces) were blow molded at an extrusion temperature of about 240° C.
Comparative 1.

A portion of the mixture was homogenized in a Werner & Pfleiderer twin screw extruder at a temperature of about 250° C. and was then fed directly to the same extrusion blow molding machine used in Example 1, above, to make bottles of homogeneous wall structure.
Control 1.

As a control, bottles were also made using the polyolefin alone in the same extrusion blow molding machine at an extrusion temperature of about 190° C.

Bottles from each of the three categories were tested visually and were tested for barrier to permeation of unleaded gasoline and pneumatic impact strength of the walls. Test results are in Table I.

TABLE I

| | Visual | Pneumatic impact strength (kg-cm/mil) | Permeation barrier (g-loss) |
|---|---|---|---|
| Example 1, this invention | laminar distribution of polyamide | 2.40 | 0.25 |
| Comparative 1, homogeneous structure | homogeneous material distribution | 9.8 | 1.75 |
| Control 1, polyethylene | same material throughout | 2.14 | 19 |

Visual testing was conducted by inspection, with and without the use of an optical microscope, of edge slices of material from the bottles. As indicated in the Table, bottles from Comparative 1 and Control 1 exhibited no laminar structure. Bottles from Example 1 did exhibit a laminar structure of polyamide layers distributed through the bottle wall thickness. Edge slices of the bottle walls viewed through cross polarized light filters clearly evidenced laminar distribution of the polyamide in bottles of Example 1 and evidenced homogeneous distribution of polyamide in bottles of Comparative 1. The polyamide layers were estimated to be about 0.5 to 15 micrometers thick, distributed as multiple, overlapping, layers across the bottle wall which was about 1 millimeter thick.

Pneumatic impact was determined by adapting the procedure of ASTM D-3099 to test wall sections of the bottles. The procedure, generally described, involves determination of the energy absorbed by a test portion of the wall material where it is struck by a pneumatically driven steel ball.

Barrier to permeation was tested by adding 100 cubic centimeters of unleaded gasoline to bottles from each category, sealing the bottles, and then determining weight loss after 500 hours at about 23° C. and about 50 percent relative humidity. It is noted that the bottles of the invention exhibited barrier to permeation of gasoline almost forty times as great as bottles of the same material with homogeneous walls and more than seventy-five times as great as the polyethylene control.

EXAMPLES 2–7

Using the same polyolefin, polyamide and compatibilizer as in Example 1, several different weight ratios of the materials were mixed and 450 milliliter (16 ounce) bottles were blown using the same blow molding and extruding machinery as under Example 1, above. The bottles were blown to have walls of about 0.75–1 millimeter thickness—slightly less than the bottles under Example 1, above. For comparative purposes, Comparative 2 and 3 and Control 2 were also run. Except for the slightly thinner bottle wall thickness, Example 2. Comparative 2, and Control 2 represent repeat runs of the bottles made under Example 1, above.

The bottles were tested visually and barrier to permeation of fluid was tested by the gasoline loss test described under Example 1, above, except that the test was run for 34 days.

Results of the tests are shown in Table II. Laminar walls means that sections of the walls could be delaminated or pulled apart in layers without cohesive failure. Bottles from Comparative and Control examples had uniform walls which could not be so-delaminated.

TABLE II

| Run Number | Polyolefin/ polyamide/ compatibilizer (weight ratios) | Nature of blend | Nature of walls | Permeation barrier (g-loss) |
|---|---|---|---|---|
| Example 2 | 77/20/3 | Heterogeneous | Laminar | 0.39 |
| Example 3 | 79/20/1 | " | " | 0.36 |
| Example 4 | 82/15/3 | " | " | 0.38 |
| Example 5 | 84/15/1 | " | " | 0.36 |
| Example 6 | 87/10/3 | " | " | 0.43 |
| Example 7 | 89/10/1 | " | " | 0.46 |
| Comparative 2 | 77/20/3 | Homogeneous | Uniform | 15.1 |
| Comparative 3 | 79/20/1 | " | " | 10.2 |
| Control 2 | 100/0/0 | " | " | 27.2 |

EXAMPLE 8

In this example, bottles were made using the same polyethylene and polyamide as in previous examples along with a compatibilizer of zinc-neutralized copolymer of ethylene and methacrylic acid. The compatibilizer was about 90 weight percent ethylene and about 10 weight percent methacrylic acid wherein about 70 percent of the methacrylic acid groups were neutralized by zinc ions. The compatibilizer exhibited a melt index of about 1.1 as determined at 190° C. in accordance with ASTM D-1238.

Bottles having laminar walls were blown using the same equipment as previously described and a heterogeneous mixture of component materials made up of 82 weight parts polyethylene, 15 weight parts polyamide, and 3 weight parts compatibilizer.

Fluid permeation was determined, as previously described, using unleaded gasoline; and, in 25 days, bottles of this example exhibited a loss of about 0.5 grams compared with a loss of about 25 grams from polyethylene control bottles made during the same runs.

EXAMPLE 9

Example 8 was repeated except that the compatibilizer was a polymer made by grafting fumaric acid to a copolymer of ethylene, propylene, and 1,4-hexadiene (71/25/4, weight ratio) such that the compatibilizer contained about 1.8 weight percent fumaric anhydride functionality. The material and its preparation is described in more detail in U.S. Pat. No. 4,026,967. Bottles prepared using that compatibilizer exhibited loss of about 0.5 grams of unleaded gasoline in the previously described fluid permeation test, after 25 days.

EXAMPLE 10

As an extrusion of Example 4, the same mixture of materials, including the fumaric-grafted compatibilizer, in the same weight ratio, was used to blow mold containers having a capacity of about 18 liters (5 gallons) and a wall thickness of about 3 millimeters (125 mils). The bottle-making equipment used was sold by Ingersoll Rand of Nashua, N.H., U.S.A. and was identified as model B-30 with a barrier flighted screw and reciprocating action. The extrusion temperature was about 243° C. (470° F.).

To test the fluid permeation barrier, about three liters of unleaded gasoline were placed in these bottles and in polyethylene control bottles of the same size made in the same sequence of runs. The bottles were located outdoors, in ambient conditions, shaded from direct overhead sun exposure, for 72 days through summer-autumn weather in Wilm., Del., U.S.A. During that period, the bottles of this invention exhibited a loss of about 3.5 grams of gasoline and the control bottles exhibited a loss of about 123 grams of gasoline.

EXAMPLE 11

In this example, polyolefin, polyester and a compatibilizer were used to make laminar film materials of this invention.

The polyester was polyethylene terephthalate exhibiting an inherent viscosity of 0.72, commercially available from Goodyear Tire and Rubber, Chemical Division, Akron, Ohio, U.S.A. under the designation "Clear Tuf" 7207.

The polyolefin was a linear polyethylene having a density of 0.944 gram per cubic centimeter, a melt index of 0.25 as determined according to ASTM D-1238, commercially available from E. I. du Pont de Nemours and Company under the trademark designation "Alathon" 7810.

The compatibilizer was the same as that used in Example 1.

A mixture of particles of 77 weight percent polyolefin, 19 weight percent polyester, and 4 weight percent compatibilizer was shaken together to achieve complete, even, particle distribution.

A portion of the mixture was fed directly into a 2.54 cm (1 inch) extruder with a length to diameter ratio of 25 equipped with a low-mixing screw having a compression ratio of 1:1. The extruder was sold by Wayne Machine and Die Company, Totowa, N.J., U.S.A. A film was made by extruding the heterogeneous melt through a 10 centimeter (4 inch) sheet die maintained at 325° C. The film having a thickness, as extruded, of about 0.2–0.4 millimeters was pressed to smooth it in a hydraulic press under about 1720 kilopascals (250 psi) at 225° C. for 3 minutes, to a thickness of about 0.1–0.3 millimeters.

The pressed film was subjected to a toluene permeability test developed as a modified version of ASTM E-96. A film sample was cut to fit the mouth of an 8 oz. wide-mouth bottle such as those sold as jelly jars by the Ball Corporation, Muncie, Ind., U.S.A. Fifty milliliters of toluene were placed into a bottle and a film sealed to the mouth. Permeability tests were conducted at about 20° C. on triplicate samples. The individual results were averaged and are reported in Table III, below. Control tests were conducted on films made in the same way but using the polyolefin alone. The tests were run for 10 to 20 days to a substantial weight loss.

EXAMPLE 12

Example 11 was repeated using 78 weight percent of the same polyolefin, 19 weight percent of the same polyester, and 3 weight percent of the compatibilizer used in Example 9. Films were made in the same way as in Example 11 and were subjected to the toluene permeability test. Results are reported in Table III, below.

EXAMPLE 13

Example 11 was repeated using 69 weight percent of the same polyolefin, 19 weight percent of the same polyester, and 12 weight percent of a different compatibilizer. The compatibilizer was a sodium-neutralized copolymer of ethylene and methacrylic acid. The compatibilizer was about 85 weight percent ethylene and about 15 weight percent methacrylic acid wherein 60 percent of the methacrylic acid groups were neutralized by sodium ions. The compatibilizer exhibited a melt index of about 0.9 as determined at 190° C. in accordance with ASTM D-1238. Films were made in the same way as in Example 11 and were subjected to the toluene permeability test. Results are reported in Table III, below.

EXAMPLE 14

Example 11 was repeated using 71 weight percent of the same polyolefin, 19 weight percent of a different polyester, and 10 weight percent of the same compatibilizer. The polyester was polybutylene terephthalate commercially available from Eastman Chemical Products, Inc., Kingsport, Tenn., U.S.A., under the trademark designation "Tenite" 6P5DE. Films were made in the same way as in Example 11 and were subjected to the toluene permeability test. Results are repeated in Table III, below.

EXAMPLE 15

Example 11 was repeated using 65 weight percent of the same polyolefin, 30 weight percent of a polycarbonate, and 5 weight percent of the same compatibilizer. The polycarbonate is commercially available from General Electric Company, Plastics Dept., Pittsfield, Mass., U.S.A., under the trademark designation "Lexan" NC 101 and is characterized as high viscosity polycarbonate. Films were made in the same way as in Example 11 and were subjected to water permeability tests wherein the same procedure was followed as was used for the toluene permeability tests, except that water was substituted for the toluene. The laminar structure of this example exhibited water permeability of 24 qm/mil/24 hr/1000 in$^2$ as compared with a water permeability of 97 gm/mil/24 hr/1000 in$^2$ for polycarbonate as reported in Modern Packaging Encyclopedia, Dec. 1979, page 37.

TABLE III

| Example Number | Polyolefin/ Polyester/ Compatibilizer (weight ratios) | Nature of film | Permeability (gm/mil/24 hr/ 1000 in$^2$) |
|---|---|---|---|
| 11 | 77/19/4 | Laminar* | 48 |
| 12 | 78/19/3 | " | 81 |
| 13 | 69/19/12 | " | 121 |
| 14 | 71/19/10 | " | 95 |
| 15 | 65/30/5 | " | 24** |
| Control | 100/0/0 | Uniform | 515 |

*Laminar nature means that the films had a structure of polyester layers distributed in the polyolefin through the thickness of the film.
**This value is for water permeability rather than for toluene permeability as is the case for all other entries in this column.

I claim:

1. A process for manufacturing a laminar, shaped, article of polymeric material comprising the steps of: (i) establishing a method, heterogeneous, blend of 60–95 weight percent polyolefin, 5 to 40 weight percent of a condensation polymer incompatible with the polyolefin, and 0.25 to 12 weight percent of an alkylcarboxyl-substituted polyolefin with an unsaturated monomer having a carboxylic moiety grafted to a polyolefin, by heating the blend above the melting point of the highest melting polymer component; and (ii) forming the melted blend by (a) stretching a body of the melt 100 to 500 percent in at least one direction and (b) cooling the stretched body to below the melting point of the lowest melting polymer component wherein the polyolefin is present, in the article, in the form of a continuous matrix phase and the condensation polymer incompatible with the polyolefin is present, in the article, in the form of a discontinuous distribution of thin, substantially two-dimensional, parallel and overlapping layers and the alkylcarboxyl-substituted polyolefin is present between the matrix and the layers and adheres the matrix and the layers together.

2. The process of claim 1 wherein the melted, heterogeneous, blend is established by heating particles of the polyolefin, the condensation polymer, and the alkylcarboxyl-substituted polyolefin, without substantial additional mixing, to a temperature above the melting point of the highest melting polymer component.

3. The process of claim 1 wherein the melted, heterogeneous, blend is established by combining the polyolefin, the condensation polymer, and the alkylcarboxyl-substituted polyolefin at a temperature such that one of the polyolefin or the condensation polymer is not softened or molten and heating the combination to a temperature above the melting point of the highest melting polymer component.

4. The process of claim 1 wherein the melted, heterogeneous, blend is established by heating particles of a combination of the polyolefin and the alkylcarboxyl-substituted polyolefin and particles of the condensation polymer, without substantial additional mixing, to a temperature above the melting point of the highest melting polymer component.

5. The process of claim 1 wherein the melted, heterogeneous, blend is established by heating particles of the polyolefin and particles of a combination of the condensation polymer and the alkylcarboxyl-substituted polyolefin, without substantial additional mixing, to a temperature above the melting point of the highest melting polymer component.

6. The process of claim 1 wherein the polyolefin is selected from the group consisting of polyethylene, polypropylene, polybutylene, and copolymers of those materials.

7. The process of claim 1 wherein the condensation polymer is selected from the group consisting of polyamides and polyesters.

8. The process of claim 1 wherein the alkylcarboxyl-substituted polyolefin is selected from the group consisting of polyolefins which have carboxylic moieties attached thereto, either on the polyolefin backbone itself or on side chains.

9. The process of claim 1 wherein the stretching is in one direction.

10. The process of claim 1 wherein the stretching is in perpendicular directions.

11. The process of claim 1 wherein stretching is accomplished by extrusion of the melted blend.

12. The process of claim 11 wherein additional stretching is accomplished by blow molding the extruded blend.

13. The process of claim 1 wherein stretching is accomplished by blow molding the melted blend.

* * * * *

UNITED STATES PATENT OFFICE
CERTIFICATE OF CORRECTION

PATENT NO. : 4,410,482

DATED : October 18, 1983

INVENTOR(S) : Pallatheri Manackal Subramanian

It is certified that error appears in the above-identified patent and that said Letters Patent are hereby corrected as shown below:

Column 11, line 3, Claim 1: "method" should read
-- melted --.

Signed and Sealed this

Seventeenth Day of January 1984

[SEAL]

Attest:

GERALD J. MOSSINGHOFF

Attesting Officer

Commissioner of Patents and Trademarks